United States Patent [19]

Marker et al.

[11] Patent Number: 6,113,242
[45] Date of Patent: Sep. 5, 2000

[54] ACTIVE EDGE CONTROLLED OPTICAL QUALITY MEMBRANE MIRROR

[75] Inventors: Dan K. Marker; Richard A. Carreras, both of Albuquerque; James M. Wilkes, Sandia Park; Dennis Duneman, Albuquerque, all of N. Mex.

[73] Assignee: The United States of America as represented by the Secretary of the Air Force, Washington, D.C.

[21] Appl. No.: 09/231,149

[22] Filed: Jan. 15, 1999

[51] Int. Cl.[7] .................................................... G02B 5/08
[52] U.S. Cl. .............................................................. 359/847
[58] Field of Search ........................................ 359/846, 847, 359/878, 883

[56] References Cited

U.S. PATENT DOCUMENTS

| | | | |
|---|---|---|---|
| 3,326,624 | 6/1967 | Maydell et al. | 359/847 |
| 4,162,825 | 7/1979 | Dowty | 359/847 |
| 4,741,609 | 5/1988 | Sallis | 359/847 |
| 5,016,998 | 5/1991 | Butler et al. | 359/847 |

*Primary Examiner*—Cassandra Spyrou
*Assistant Examiner*—Mark A. Robinson
*Attorney, Agent, or Firm*—Kenneth E. Callahan

[57] ABSTRACT

A thin membrane is mounted on an optically flat circular outer ring and stretched over a smaller optically flat circular inner ring. Differential pressure is applied to the annulus formed between the inner and outer rings to prestrain the membrane and separately applied to the inner ring where the mirror figure will be produced. The inner ring has a doubly curved top surface and is optically flat so that the membrane can freely move across the inner ring as incremental stress is applied via the annulus. A calculated combination of annulus stress and differential pressure on the inner ring produces an optical quality mirror figure in the inner ring area.

2 Claims, 6 Drawing Sheets

| Differential Pressure Inner Ring (Inches of H₂O) | Calculated Incremental Strain (Prestrain) (%) | Calculated Surface Deviation (waves @ 633um) Full Aperture | Measured Surface Deviation (waves @ 633um) Full Aperture | Estimated Surface Deviation (waves @ 633um) Full Aperture | Measured Surface Deviation (waves @ 633um) Central 183 mm |
|---|---|---|---|---|---|
| 2.0 | 0.05 | 25 | n/a | 15 | 8.5 |
| 7.3 | 0.21 | 7 | 5.5 | n/a | 3.5 |

ACTIVE EDGE CONTROLLED OPTICAL QUALITY MEMBRANE MIRROR

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

This invention is in the field of very large optical apertures, and in particular to the use of thin membranes with curvature as mirror substrates.

2. Description of the Prior Art

Various focusing mirror systems fabricated from a reflective metalized membrane are known in the prior art. Commonly, a differential pressure is established between an enclosed area behind the reflective surface and the ambient pressure to control the contour of the flexible reflective surface. The curvature is controlled by various means, such as: an electropneumatic control system (U.S. Pat. No. 4,179,193); an actuator pushing or pulling on a rear membrane (U.S. Pat. No. 5,016,998): an actuator in physical contact with the rear surface of the membrane (U.S. Pat. No. 4,422,723); a double membrane with a partial vacuum between with a complex edge tensioning system to vary the curvature (U.S. Pat. Nos. 5,680,262 and 5,552,006); and a curvature determined by uniform differential pressure applied to a membrane with a non-uniform radial distribution of thickness or a uniform membrane loaded with a non-uniform differential pressure obtained by localized electrostatic or magnetic pressure (U.S. Pat. No. 4,046,462).

Most of the aforementioned inventions are designed for solar energy concentrators. The curvatures obtained do not approach the optical quality required of an astronomical telescope. Optical quality telescopes used with real time monochromatic holography, for example, should have surfaces that deviate no more than 40 lines per mm of localized tilt and 200 waves of a low spatial frequency aberration for any given mirror figure. This situation should produce a near (1.6x) diffraction limited image. Very large optical apertures, particularly for space-based systems, could benefit from lightweight, optical quality membrane mirrors. Potential applications include astronomy, imaging and surveillance, and laser beam projection.

SUMMARY OF THE INVENTION

A membrane mirror having optical quality curvature characteristics was produced using differential pressure and careful edge control of the membrane material. The thin membrane is mounted on an optically flat circular outer ring and stretched over a smaller optically flat circular inner ring. Pressure or vacuum is applied to the annulus between the inner and outer rings to prestrain the membrane and separately applied to the inner ring to thereby produce the optical quality curvature within the inner ring.

DESCRIPTION OF THE PREFERRED EMBODIMENT

Figure 1:
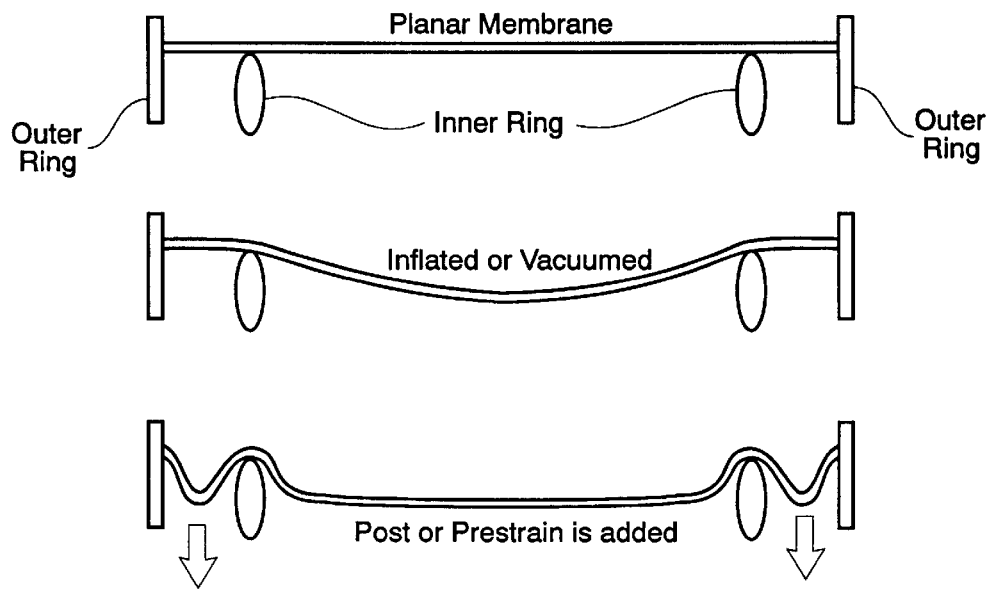
FIG. 1—Cross-sectional view of the inner and outer rings showing various strain conditions.

A doubly curved surface is used to produce a membrane mirror having optical quality curvature characteristics. The film is mounted on an optically flat circular ring and stretched over a smaller optically flat circular ring as shown in FIG. 1. Pressure or vacuum is separately applied to both the inner ring and the outer annulus to produce the optical quality curvature in the inner ring. In the atmosphere, pulling a partial vacuum on the underside of the membrane mirror creates a pressure differential. In space, a pressure chamber that is bounded by the mirrored surface and a clear polyimide sheet creates the curvature of the optic. The combination of these two sheets is referred to as the lenticular.

The reflective membranes or films may vary in thickness from 20 to 200 microns. In the preferred embodiment, an aluminum coated 125-micron thick homogeneous, planar, isotropic polyimide membrane with an inner ring aperture of 28-cm was used. An optical quality 4.47-meter concave radius of curvature figure was obtained for the 28-cm aperture. Measurement of the membrane's curvature was done with a Shack-Hartmann wavefront sensor using a 66×88-lenslet array with the focal length of each lenslet at 2 millimeters. The angular range of each lenslet is approximately ±17 milliradians.

Figure 2:
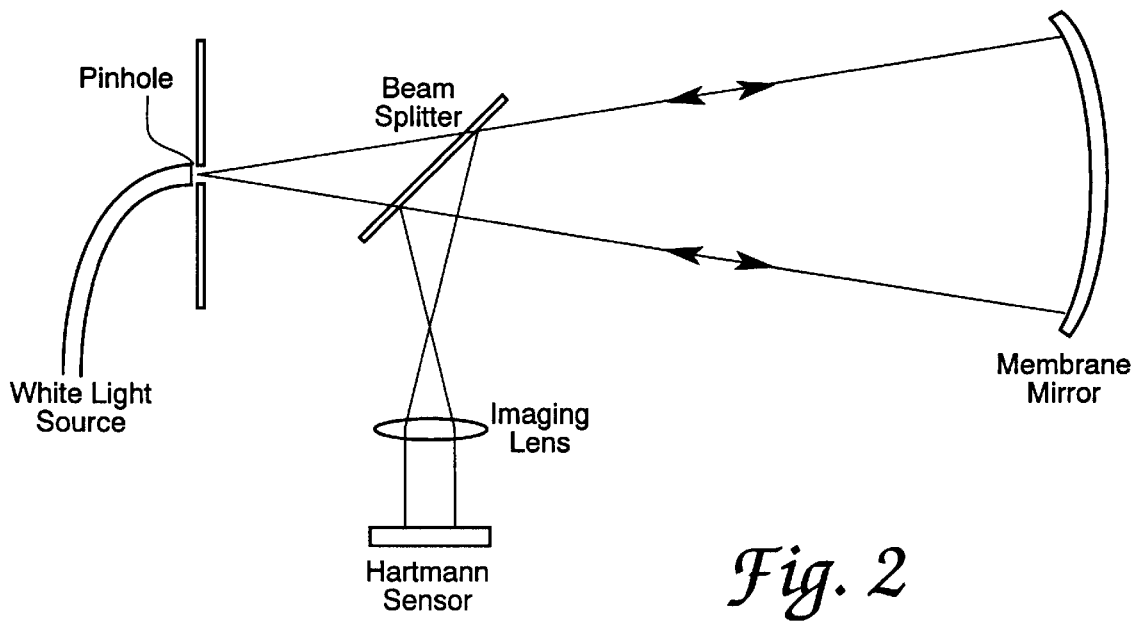
FIG. 2—Optical layout for measuring the membrane mirror curvature.

To measure the membrane mirror curvature, the mirror was illuminated at the center of curvature, as shown in FIG. 2, and then re-imaged onto the CCD array. The curvature can be measured with either a white light source or a laser. Any variance from a flat wavefront at the entrance to the lenslet array was interpreted as a slope error. The error represents the difference between the membrane and a perfect sphere.

To minimize the influence of the boundary conditions, care must be exercised in the manufacturing of the inner and outer rings and in the membrane mounting process. The outer ring, where the film is initially mounted and the inner ring where the boundary of the doubly curved surface is initiated were both optically polished planar to less than 150 nanometers. The outer ring defines the outer boundary of the membrane and if the edge is not well defined an aberrated optical surface will result. The degradation in mirror quality is proportional to the magnitude of the boundary deviation. A large deviation at the boundary of the mirror will transmit undesirable figure error into the clear aperture of the membrane.

The volume between the inner ring and the outer ring forms an outer annulus. The inner ring has a doubly curved, optically polished top surface so that the membrane can slide across it with near zero friction while maintaining a seal between the inner ring and the outer annulus even when the membrane has a concave curvature in both regions.

Incremental stress is defined as membrane stress caused by other than the evacuation stress of the inner ring, e.g., the initial clamping of the membrane to the outer ring, out of plane translation of the outer ring with respect to the inner ring, or evacuation of the outer annulus. Incremental stress, for example, can be uniformly applied to the membrane by varying the differential pressure in the outer annulus, a pressure that in general is different than that in the inner ring volume.

The outer ring should be coplanar with the inner ring, otherwise a non-symmetric stress state will be created. The last significant boundary condition involves the material that slides across the inner ring during a change of curvature, as shown in FIG. 1, which varies the amount of incremental strain in the material. This incremental strain has a remarkable effect on the optical figure. The hardware arrangement of the present invention enables one to optically modify the surface figure by varying the amount of incremental strain.

Figure 3:
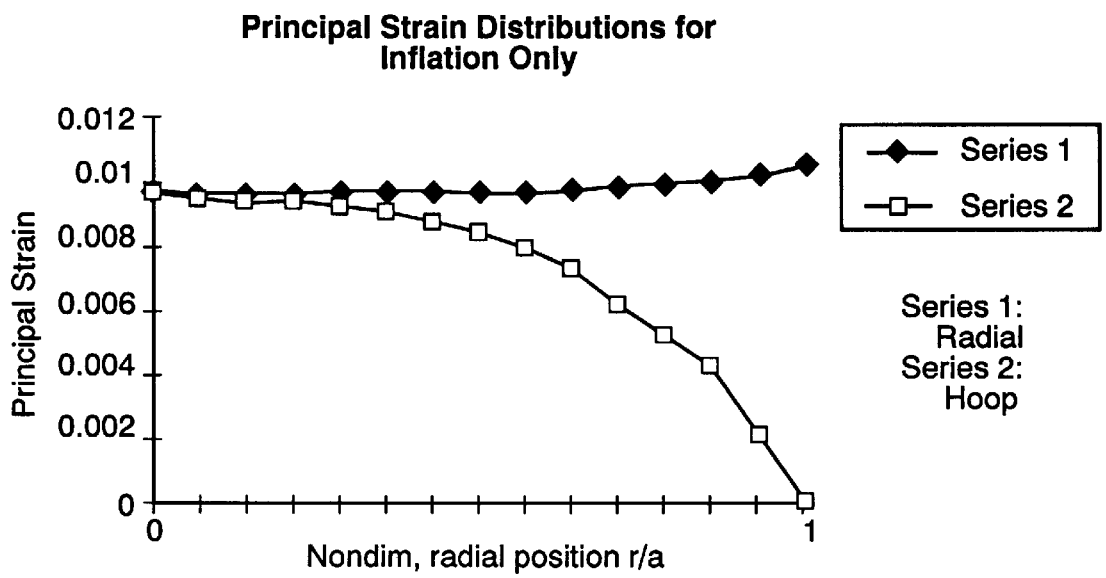
FIG. 3—Strain state with $\epsilon_i$ equal to zero.
Figure 4:
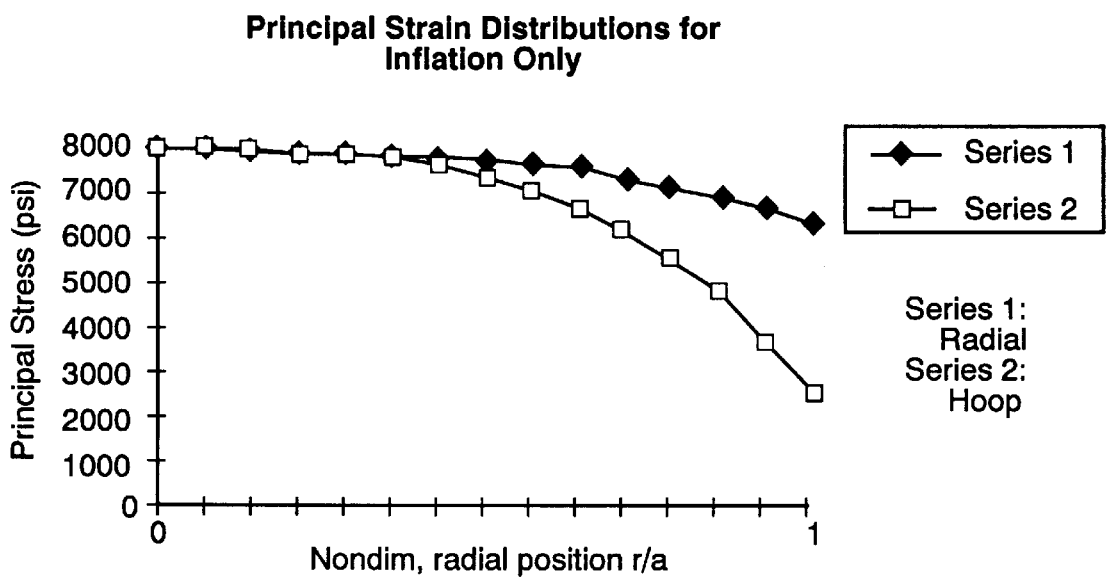
FIG. 4—Stress state with $\sigma_i$ equal to zero.

The strain state of the membrane determines the surface figure. The stress and strain states resulting from forces added during evacuation are highly nonlinear as shown in FIGS. 3 and 4. (Stress $\sigma$ is the force tending to produce deformation in the membrane measured in force/unit area. Strain $\epsilon$ is the deformation resulting from a stress measured by the ratio of the change to the total value of the dimension in which the change occurred. In the two-dimensional membrane case, a 2% strain would be an increase of 2% in the surface area of the membrane caused by an imposed stress.)

FIGS. 3 and 4 graphically show the radial and circumferential strain and stress distribution of a flat planar membrane inflated (or evacuated) to a given curvature with zero initial prestrain. Series 1 is the radial direction and series 2 is the hoop or circumferential direction and r/a is the dimensionless ratio of the radial position divided by the radius of the circular membrane under test. Zero represents the position at the center of the aperture while 1 represents the aperture's edge.

This stress/strain distribution of a clamped boundary membrane is now defined as $\sigma_e/\epsilon_e$. As long as in-plane compressive forces are not imposed, incremental stress and strain can be added or subtracted to the film via symmetric and continuous in-plane radial forces. This reasonably assumes a frictionless contact at the inner ring because the boundary exhibits no noticeable friction when compared to the movements required to make even small changes in the incremental strain. Incremental stress/strain is now defined as $\sigma_i/\epsilon_i$.

The order in which the incremental stresses and evacuation stress (of the inner ring) are imparted is irrelevant. Thus incremental stress can be added in fill or in parts before or after curvature is initiated in the inner ring. The final surface figure will be identical. The terms prestrain and poststrain are used to identify when incremental strain is added or removed from the film with respect to the state of the inner ring membrane. Prestrain is the $\epsilon_i$ added when the inner ring membrane is planar and poststrain is the $\epsilon_i$ added or removed after curvature is initiated in the inner ring.

Figure 5:
FIG. 5—Structure with flat membrane.
Figure 6:
FIG. 6—Structure with a pressure differential in the inner ring and the outer annulus.

FIG. 5 shows the mirror in the planar mode. FIG. 6 shows the mirror membrane with a vacuum applied to both the outer ring annulus and the inner ring cavity. Note how a small amount of hair can be distorted to produce longer fuller hair. This effect is produced by the concave curvature of the outer annulus, which is controlled by a separate vacuum pump. Changes in the annulus curvature will increase or decrease the incremental strain imparted on the central membrane.

Care must be exercised in maintaining the boundary conditions of the evacuated membrane and in tracking the radial migration of material across the inner ring. Consider how the effects of mounting technique ($\epsilon_t$), annulus curvature ($\epsilon_i$) and the strain ($\epsilon_e$) added due to the curvature of the central membrane will contribute to the overall strain state.

Figure 7:
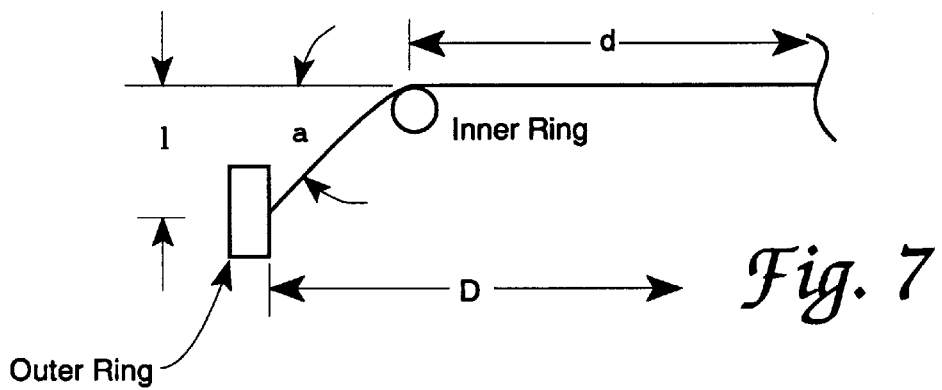
FIG. 7—Strain added during the membrane mounting process.

First, incremental strain added during the mounting process is shown in FIG. 7. As the outer ring is translated a distance l, strain will be imparted. Here the planes formed by the top surface of the inner and outer rings are maintained parallel to each other but they are displaced vertically a distance l. The strain distribution near the outer ring is highly nonlinear but the distribution within the inner ring is approximately constant.

Figure 8:
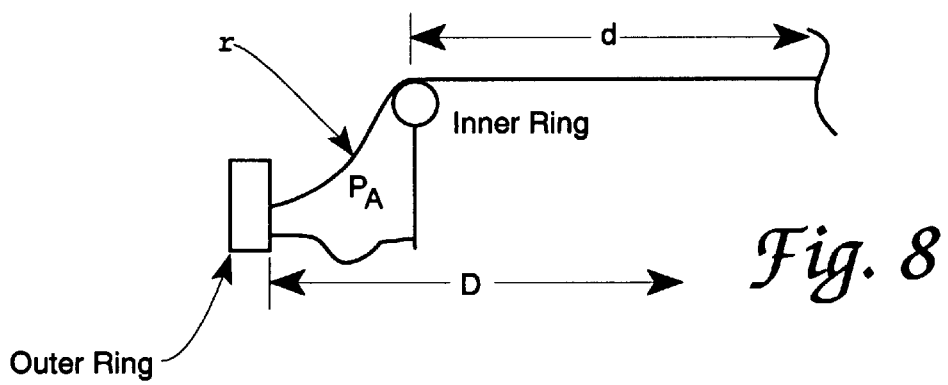
FIG. 8—Strain added by pulling a partial vacuum in the outer annulus.

Second, additional incremental strain can be added by varying the radius r shown in FIG. 8. This is accomplished by an independent vacuum pump connected to the annulus cavity. This action will pull material radially outward across the inner ring when the vacuum is increased and allow material to migrate inward when the vacuum is decreased.

Figure 10:
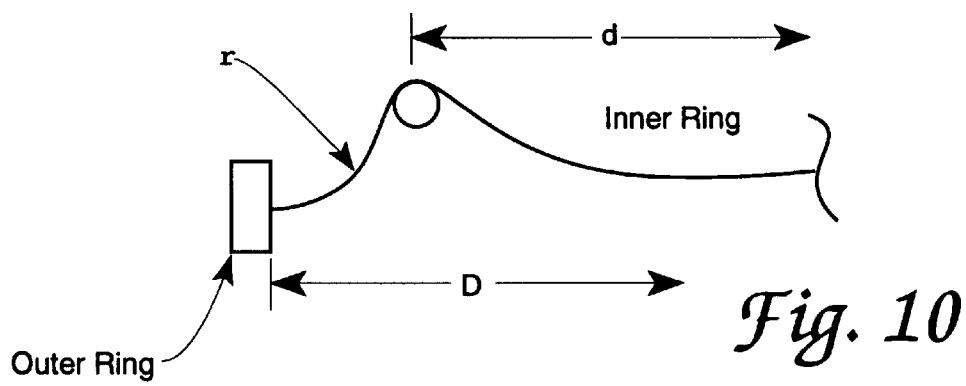
FIG. 10—Edge control applied while imaging.

Third, evacuation strain is now added by evacuating the inner ring cavity. FIG. 10 shows a state were both incremental and evacuation stresses are added to the membrane simultaneously. Incremental stresses are added or subtracted by either adding curvature to the annulus or translating the outer ring. The incremental stress is referred to the resulting stress added or subtracted to the clear aperture while evacuation stress is the non-linear stress/strain state create by the curvature due to vacuum applied. This non-linear stress/strain state is show in FIG. 3 and FIG. 4.

Figure 9:
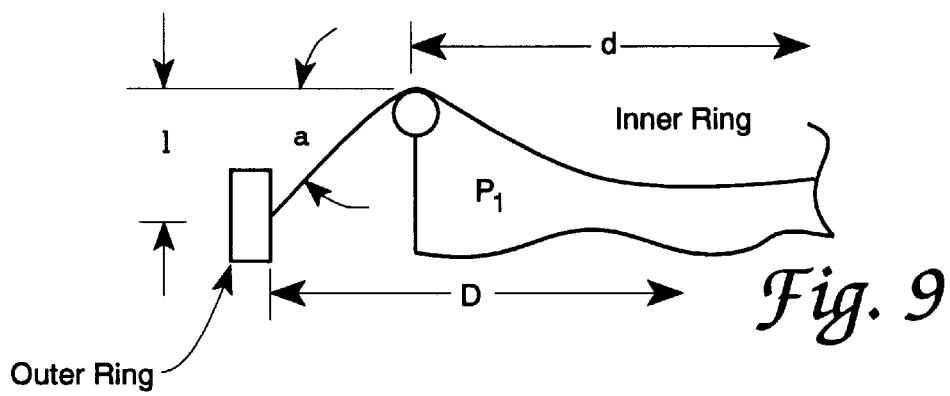
FIG. 9—Strain added by pulling a partial vacuum in the inner ring.

Adding curvature to the inner ring, as shown in FIG. 9, will result in a reduction of pre-strain. A deeper curvature will increase the radial stress at the boundary so that the force equilibrium of the annulus material is upset. Consequently a certain amount of material will migrate radially inward across the inner ring. The net effect of allowing material to radially cross the inner ring at anytime before or after inner ring curvature is initiated is simply to modify the incremental strain of the central membrane. So increasing the central curvature will reduce the amount of prestrain initially imparted on the membrane. The boundary condition of the stress/strain state shown in FIGS. 3 and 4 assume a fixed boundary. So any material that is allowed to cross the clear aperture boundary, inward or outward, will change the incremental strain state. With the correct amount of prestrain added during the mounting process, one can achieve a zero prestrain condition for any given curvature.

The surface figure was examined at two different inner cavity pressure ($P_t$) differentials; 2.0 and 7.3 inches of $H_2O$ and a single central deflection ($w_0$) of 2.18 millimeters (i.e. operating at f/8). (w is the displacement of the center point of the inner ring membrane from a flat membrane state.) With a modulus of elasticity (E) of 8800 $N/mm^2$, a radius ($r_0$) of 14 cm and a thickness (t) of 125 $\mu m$, we can estimate the prestrain using Campbell's theory [J. D. Campbell, "On the theory of initially tensioned circular membranes subjected to uniform pressure", *Q J Mech Appl Math* 9, 84–93 (1956)]. First, the total pressure ($P_t$) required to create the curvature can be viewed in two parts: pressure required to generate the evacuation stress (of the inner ring) and the pressure required to overcome the incremental stress. Incremental stress is only affected by any action that allows material to cross the clear aperture's boundary. Partial annulus vacuum will then create some incremental stress state and a different annulus vacuum will cause a different incremental stress state. Remember that incremental stress is the global stress added to the central cavity (clear aperture).

$$P_t = P_e + P_i \quad (1)$$

Using Campbell's results with 11 terms in the power series expansion for the central displacement w (instead of 6 terms used by Campbell), and a Poisson's ratio of 0.4, we have the following relationship. This relationship will estimate the pressure needed to initially inflate the membrane with zero prestrain (this assumes a clamped boundary condition with no bending):

$$w_0 = 0.626 \cdot r_0 \cdot \left( \frac{P_e \cdot r_0}{E \cdot t} \right)^{\frac{1}{3}} \quad (2)$$

Solving for $P_e$ we have 0.5 inches of $H_2O$. We now use equation (1) to determine the pressure needed to overcome the incremental strain. Pressure ($P_i$) is easily calculated at both data points to be 1.5 and 6.8 inches of $H_2O$. Now the use of Campbell's results will estimate the in-plane incremental stress at these two pressure data points.

$$w_0 = \frac{P_i \cdot r_0^2}{4 \cdot \sigma_i \cdot t} \quad (3)$$

Solving $\sigma_i$ at ($P_i$) equal to 1.5 and 6.8 inches of $H_2O$, we can use the following relationship to estimate the linear strain, $$\varepsilon_i = \sigma_i \cdot \left( \frac{1-\nu}{E} \right) \quad (4)$$

where $\nu$ is Poisson's ratio.

Figures 11, 12:
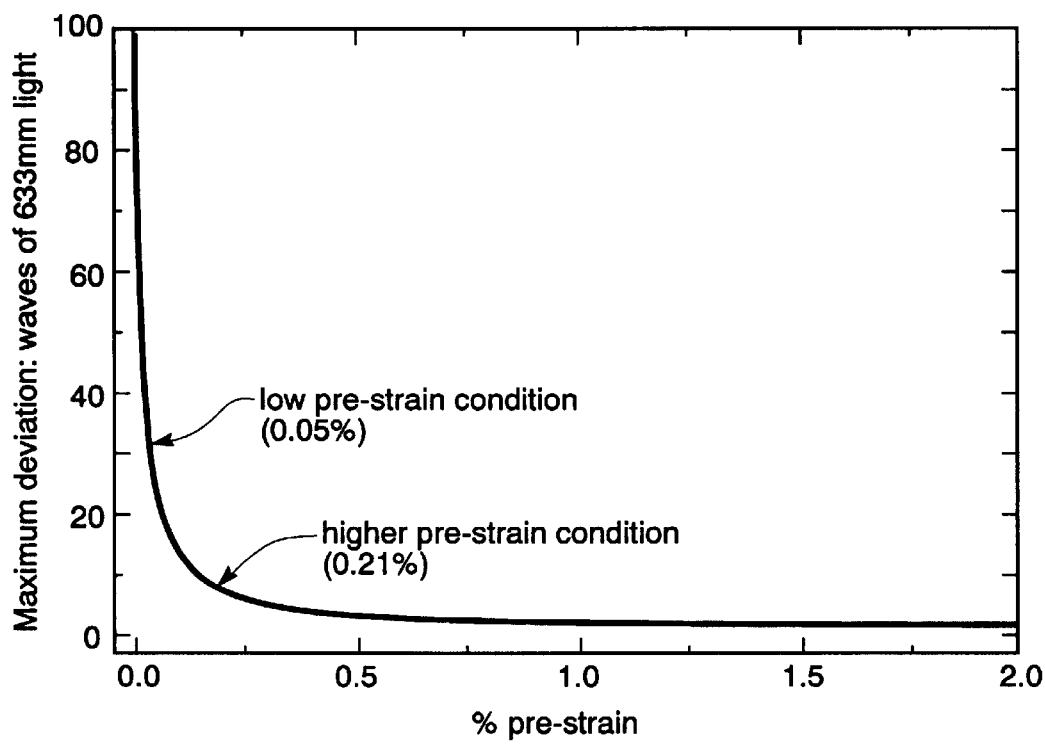
FIG. 11—Graph showing measured and calculated spherical aberration.
FIG. 12—Table summarizing theoretical vs. experimental results.

These two data points are shown plotted on the graph in FIG. 11. With $\lambda$ equal to 633 nm, a pre-strain of 0.05% is estimated to produce 25$\lambda$ of spherical aberration and a pre-strain of 0.21% is estimated to produce 7$\lambda$ of spherical aberration. Higher pre-strains produce a stiffer membrane within the inner cavity. Inner cavity pressure must increase to create an identical central deflection. We would expect the experimental data to closely agree with this estimate.

The Shack-Hartmann results are now compared with our theoretical prediction. The following data sets are taken at the same two central pressures used in the previous calculations. At each pressure, two data sets will describe the mirror's optical figure: one at the fill inner ring aperture of 280-mm diameter, and one when the aperture is stopped down to 183 millimeter diameter. The Hartmann sensor is driven out of range when the entire aperture is viewed at the low central pressure. In this case, the estimated surface quality is derived from a model based upon Hartmann sensor data for the central 183-mm and an interpretation of Foucault test data for the full aperture.

The measured spherical aberration for the two pressure data points and the associated spherical aberration calculated using Campbell's results are summarized in FIG. 11. Note that the theoretical and experimental spherical distortions are in good agreement. Compare the spherical aberration for the 183-mm aperture and one immediately sees a similar trend. The measured results are within 40% of calculated for the low pressure and within 22% of calculated for the high pressure. The error comes primarily from our inability to precisely measure the total incremental strain added. The trend of the spherical correction is probably more important then the actual correlation but for laboratory results we are very exciting.

Clearly, there is a strong correlation between theory and the laboratory results. More importantly, we are able to experimentally prove the idea of adding prestrain to manipulate the surface qualty at optical tolerances. Essentially, the more prestrain that is added to a membrane, the more spherical the shape will become. It is not possible to create a parabolic surface from a planar, homogeneous, isotropic, uniform thickness membrane mounted onto a planar circular ring. A sphere is the mechanical limit, which implies that $\epsilon_i >> \epsilon_e$. As the strain due to evacuation becomes dominant the geometry of the outer third of the membrane's aperture becomes more oblique. Thus as the figure diverges from a sphere, the divergence from a parabolic shape becomes even greater.

Spherical surfaces are still quite useful, being employed in many optical designs even at low focal lengths. Furthermore, at focal lengths above an f-number of 12 the spherical and parabola surfaces are virtually identical. Real time holography relaxes the surface demands and will allow a spherical surface to be used as a parabolic optical element at an f-number of 3 or more and be fully corrected.

We claim:

1. A method for producing an optical quality membrane mirror, the method comprising:

a. clamping a reflecting membrane to an outer optically flat circular ring;

b. centrally positioning said membrane over a smaller inner circular ring while maintaining the plane formed by the top surface of said inner and outer rings in parallel, the top surface of said inner ring having a doubly curved cross-section and being optically flat such that differential pressures can be maintained in the inner ring and in the annulus formed between the inner and outer rings, and such that the membrane is free to move across said inner ring's surface;

c. calculating the differential pressures required in both the inner ring and the annulus to achieve a desired optical quality curvature of the inner ring portion of the membrane; and d. producing said calculated pressure differentials to thereby obtain the desired optical quality curvature in the inner ring.

2. An optical quality membrane mirror comprised of:

a. an outer circular ring having an optically flat top surface with a thin reflecting membrane stretched across and attached to said top surface;

b. an inner ring having a top surface with a doubly curved cross-section and being optically flat, said inner ring being centrally located inside said outer ring such that the plane of the top surfaces of both rings are parallel to each other and the membrane is in sufficient contact with the inner ring so that a pressure differential can be maintained between the annulus formed by the inner and outer rings;

c. means for producing a pre-calculated differential pressure in both the annulus and in the inner ring to thereby form an optical quality mirror figure of a desired curvature in the inner ring.

* * * * *